US009538740B2

(12) United States Patent
Haik

(10) Patent No.: US 9,538,740 B2
(45) Date of Patent: Jan. 10, 2017

(54) RED PALM WEEVIL SENSING AND CONTROL SYSTEM

(71) Applicant: United Arab Emirates University, Al Ain (AE)

(72) Inventor: Yousef Haik, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 334 days.

(21) Appl. No.: 13/684,513

(22) Filed: Nov. 24, 2012

(65) Prior Publication Data

US 2013/0199082 A1 Aug. 8, 2013

Related U.S. Application Data

(60) Provisional application No. 61/563,740, filed on Nov. 25, 2011.

(51) Int. Cl.
| | | |
|---|---|---|
| *A01M 1/04* | (2006.01) | |
| *A01M 1/10* | (2006.01) | |
| *A01M 1/02* | (2006.01) | |

(52) U.S. Cl.
CPC ............. *A01M 1/103* (2013.01); *A01M 1/02* (2013.01); *A01M 1/026* (2013.01)

(58) Field of Classification Search
CPC ..................................................... A01M 1/026
USPC ....... 43/107, 108, 132.1, 113, 121, 122, 124
IPC .............................. A01M 1/00, 1/02, 1/04, 1/10
See application file for complete search history.

(56) References Cited

U.S. PATENT DOCUMENTS

| | | | |
|---|---|---|---|
| 2004/0057977 A1* | 3/2004 | Gardner et al. | 424/410 |
| 2006/0008491 A1* | 1/2006 | Leach et al. | 424/405 |
| 2007/0107297 A1* | 5/2007 | Wijenberg et al. | 43/107 |
| 2008/0204253 A1* | 8/2008 | Cottee et al. | 340/573.2 |
| 2010/0083556 A1* | 4/2010 | Wright et al. | 43/1 |
| 2010/0323891 A1* | 12/2010 | Bigorra Llosas et al. | 504/118 |

OTHER PUBLICATIONS

Wu, Shao-Hua; "Ten-membered lactones from *Phomopsis* sp., an endophytic fungus of Azadirachta indica", 2008.*

* cited by examiner

*Primary Examiner* — Thien Thanh Pham
(74) *Attorney, Agent, or Firm* — Akerman LLP; Michael K. Dixon

(57) ABSTRACT

A red palm weevil control system for retaining and exterminating red palm weevils in palm trees is disclosed. The control system may include one or more light detection systems, one or more light emitting devices positioned such that light emitted from the light emitting device can be detected by the light detection system, and one or more red palm weevil food materials that is configured to block light emitted from the light emitting device from being sensed by the light detection system. In use, once a red palm weevil has eaten the food, the light detection system senses the light emitted from the light emitting device, signifying the presence of red palm weevils. The red palm weevil food material may also include a magnetic material and an antimicrobial material.

12 Claims, 4 Drawing Sheets

RED PALM WEEVIL SENSING AND CONTROL SYSTEM

CROSS-REFERENCE TO RELATED APPLICATION

This application claims priority to U.S. Provisional Patent Application No. 61/563,740, filed Nov. 25, 2011, the entirety of which is incorporated herein.

FIELD OF THE INVENTION

This invention is directed generally to systems for exterminating red palm weevils, and more particularly to systems for sensing and exterminating red palm weevils.

BACKGROUND

Red palm weevils, which has a scientific name of *Rhynchophorus ferrugineus*, are the most dangerous insect that attacks date palm trees and have been causing serious economic consequences in commercial date palm tree farms. Red palm weevils survives with a symbiotic association of a variety of microflora including protozoa in the hind gut and ligo-cellulose digestive tracts. The mutualistic associations of these microbes help the red palm weevils to be able to degrade wood and wood constituents, such as cellulose and hemi-cellulose, which is plant-derived biomass.

SUMMARY OF THE INVENTION

A red palm weevil control system for retaining and exterminating red palm weevils in palm trees is disclosed. Red palm weevils pose a serious threat to palm trees. The weevils invade a palm tree and completely destroy it. The control system may include one or more light detection systems, one or more light emitting devices positioned such that light emitted from the light emitting device can be detected by the light detection system, and one or more red palm weevil food materials that is configured to block light emitted from the light emitting device from being sensed by the light detection system. In use, once a red palm weevil has eaten the food, the light detection system senses the light emitted from the light emitting device, signifying the presence of red palm weevils. The red palm weevil food material may also include a magnetic material and an antimicrobial material.

A conjugated metalo-organic complex may be synthesized to sense and control the manifestation of red palm weevils. The conjugated complex may be made of nano-structures with properties to respond to applied magnetic fields and, at the same time, have antimicrobial properties. The nanostructure may be placed in a trap made from red palm weevil preferred feed and placed in a potentially infected tree. The red palm weevil control system may use magnetic responsiveness of the conjugated structure to report the infestation of the red palm weevils with minimum human intervention. The antimicrobial component of the conjugate may be usable to kill the bacteria in the digestive track of the red palm weevil causing immediate death to the red palm weevil.

In one embodiment, the red palm weevil control system may be formed from one or more light detection systems and one or more light emitting devices positioned such that light emitted from the light emitting device can be detected by the light detection system. The red palm weevil control system may also include one or more red palm weevil food materials blocking light emitted from the light emitting device from being sensed by the light detection system. In one embodiment, the light detection system may be, but is not limited to being, one or more solar cells. The red palm weevil control system may also include one or more radio frequency devices in communication with the solar cell that is configured to emit a radio frequency once the solar cell begins to receive light from the light emitting device. A radio frequency receiver may also be configured to receive a radio frequency emitted by the radio frequency device and to create an alert upon receiving the radio frequency signifying the presence of a red palm weevil.

The red palm weevil food material may include one or more nanoparticles. In one embodiment, the nanoparticle may be conjugated with fungi extracted from neem leaves. The nanoparticle may also be formed from iron oxide and silver-copper-boron, Ag—Cu—B—Fe—Gd, FeO, or Ag—Cu—B, or any combination thereof. In one embodiment, the nanoparticles may be larger than nanoparticles and may have any appropriate size.

In one embodiment, the red palm weevil control system may be formed from one or more light detection systems. The light emitting device may be positioned on one side of the red palm weevil food material, and a mirror may be positioned on an opposite side of the red palm weevil food material. As such, the red palm weevil food material may block reflection of light emitted from the light emitting device to reach the light detection system.

The red palm weevil control system may also include a magnetic field generator for generating a magnetic field to retain red palm weevils that have already ingested food containing magnetic nanoparticles. The magnetic nanoparticle is formed from FeO, Fe—Gd, magnetic nanoparticles coated with extract from neem leaves and other appropriate materials. The magnetic nanoparticles may be combined with the food material and fed to the red palm weevils. After the red palm weevils ingest the food material, the magnetic field generator may be used to collect and retain the red palm weevils by attracting the magnetic materials within the digestive tracts of the red palm weevils to the magnetic generator.

An advantage of this system is that the red palm weevil control system enables the presence of one or more red palm weevils to be detected.

Another advantage of this system is that the red palm weevil control system retains red palm weevils that have eaten food material with magnetic nanoparticles.

Another advantage of this system is that red palm weevil control system eradicates bacteria within the digestive system of the red palm weevil, which causes the death of the red palm weevil in which the bacteria was present.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
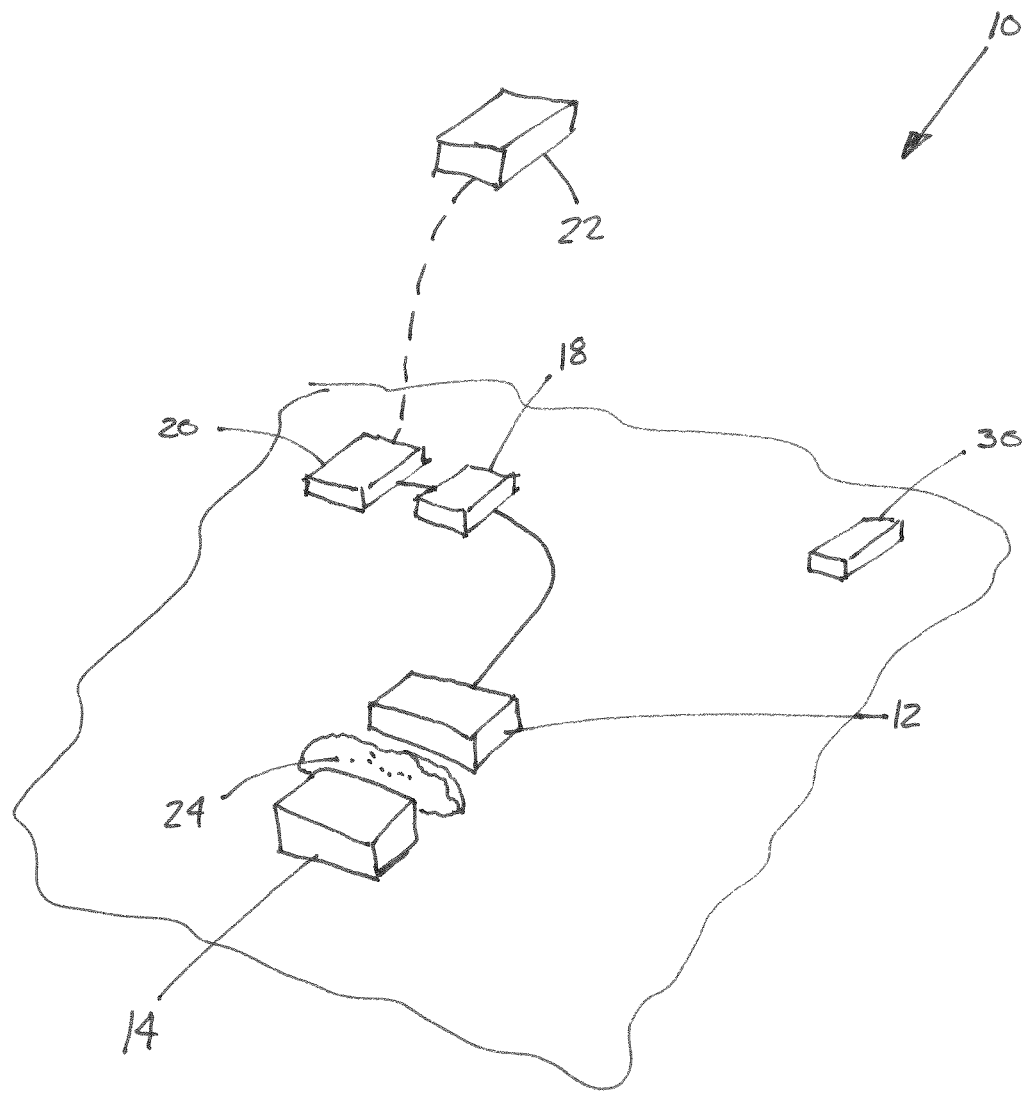
FIG. 1 is a schematic view of the red palm weevil control system.
Figure 2:
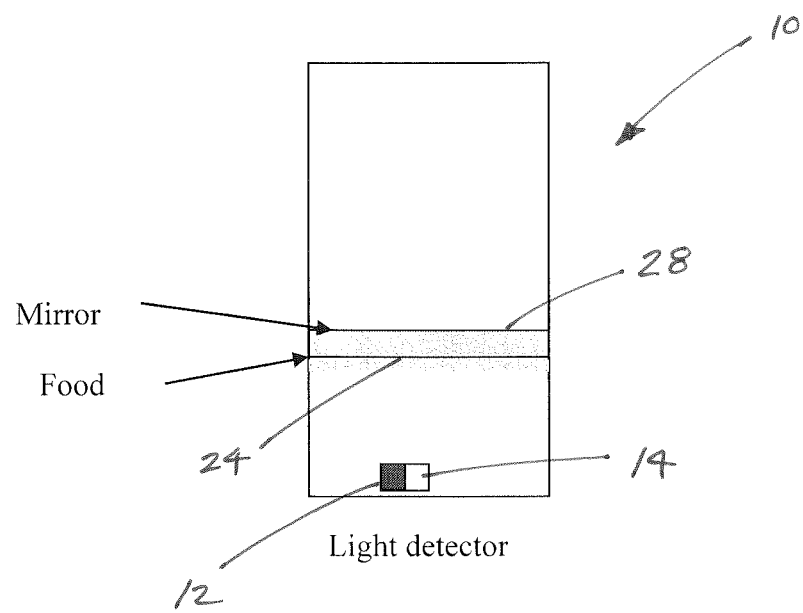
FIG. 2 is an alternative embodiment of the red palm weevil control system with a mirror.

As shown in FIGS. 1-8, a red palm weevil control system 10 for retaining and exterminating red palm weevils in palm trees is disclosed. Red palm weevils oppose a serious threat to palm trees. The weevils invade a palm tree and completely destroy it. As shown in FIG. 1, the control system 10 may include one or more light detection systems 12, one or more light emitting devices 14 positioned such that light emitted from the light emitting device 14 can be detected by the light detection system 12, and one or more red palm weevil food materials 16 that is configured to block light emitted from the light emitting device 14 from being sensed by the light detection system 12. In use, once a red palm weevil has eaten the food, the light detection system 12 senses the light emitted from the light emitting device 14, signifying the presence of red palm weevils. The red palm weevil food material 16 may also include a magnetic material and an antimicrobial material.

Figure 3:
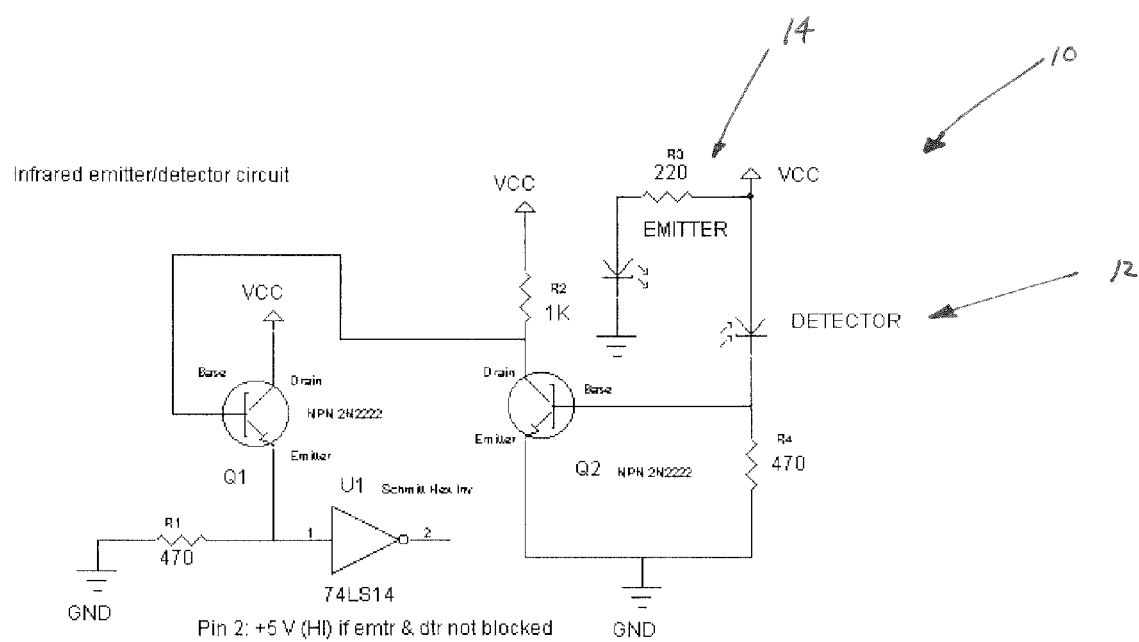
FIG. 3 is a schematic diagram of a light emitting device and a light detection system of the red palm weevil control system.

The red palm weevil control system 10 may include one or more light detection systems 12 as shown in FIGS. 1 and 3. The light detection system 12 may be any appropriate light receiver capable of receiving the transmission of light from the light emitting device 14. The light detection system 12 may be configured as desired and may perceive visible light and light at other wavelengths, such as, but not limited to, infrared light. In one embodiment, the light detection system 12 may be formed from one or more solar cells 18.

The red palm weevil control system 10 may include one or more light emitting devices 14 positioned such that light emitted from the light emitting device 14 can be detected by the light detection system 12. The light emitting device 14 may have any appropriate configuration and may be configured to emit light capable of being perceived by the light detection system 12. The light emitting device 14 may emit visible light and light at other wavelengths, such as, but not limited to, infrared light. Alternatively, the light emitting device 14 may emit only visible light.

In one embodiment, as shown in FIG. 1, one or more radio frequency devices 20 may be in communication with the solar cell 18 that is configured to emit a radio frequency once the solar cell 18 begins to receive light from the light emitting device 14. The light emitted from the light emitting device 14 is converted in the solar cell 18 into an electric current. The electric current is transmitted to the radio frequency device 20 which in turn generates a radio frequency. The red palm weevil control system 10 may also include a radio frequency receiver 22 configured to receive a radio frequency emitted by the radio frequency device 20 and to create an alert upon receiving the radio frequency signifying the presence of a red palm weevil. The alert may be, but is not limited to being, an audio alert or a visually perceivable alert, or both.

Figure 5:
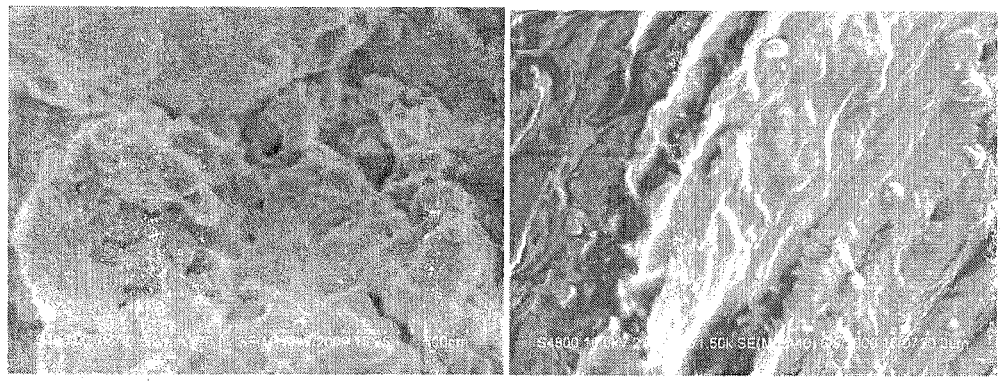
FIG. 5 is an image from a scanning electron microscope of a portion of intestines for larva fed with artificial food.
Figure 6:
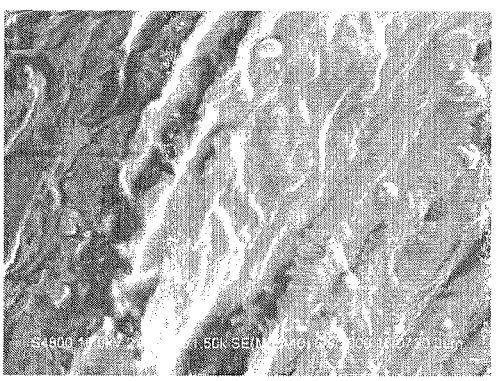
FIG. 6 is an image from a scanning electron microscope of a portion of intestines for larva fed with artificial food having magnetic material that is displayed in the image.
Figure 7:
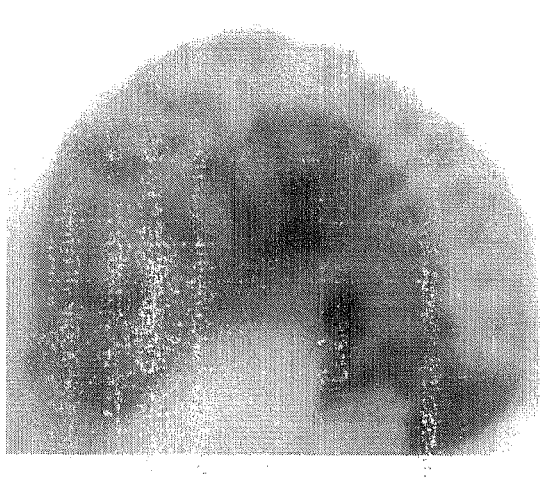
FIG. 7 is an image of a larva weevil after feeding on artificial food containing antimicrobial materials.
Figure 8:
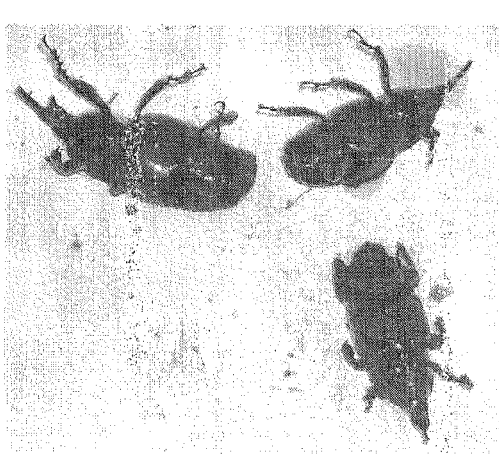
FIG. 8 is an image of an adult red palm weevil after feeding on artificial food containing antimicrobial materials.

The red palm weevil control system 10 may also include one or more red palm weevil food materials 16 blocking light emitted from the light emitting device 14 from being sensed by the light detection system 12. The red palm weevil food material 16 may include one or more nanoparticles 24. The nanoparticles 24 may have more than one function. For instance, the nanoparticles 24 may be magnetic and may retain red palm weevils when subjected to a magnetic field. The nanoparticles 24 may also be configured to eradicate bacteria in the red palm weevil digestive system that are necessary for the red palm weevil's digestive system, as shown in FIG. 6 and compared with food material without magnetic nanoparticles, as shown in FIG. 5. Killing the bacteria in the digestive tract of the red palm weevil, kills the red palm weevil itself, as shown in FIGS. 7 and 8. The nanoparticles 24 may be formed from materials such as, but not limited to, iron oxide and silver-copper-boron, Ag—Cu—B—Fe—Gd, FeO, and Ag—Cu—B. The Fe—Gd portion of the nanoparticles may be magnetically responsive portion, and the Ag—Cu—B portion of the nanoparticles are the bacteria inhibitors. The nanoparticles 24 of FeO may be synthesized using co-precipitation techniques.

In yet another embodiment, the nanoparticles 24 may be coated with an antimicrobial agent, such as, but not limited to, extract from neem leaves. The extract from neem leaves may replace the Ag—Cu—B particles or may be added in addition to the Ag—Cu—B particles. More particularly, the nanoparticles 24 may be conjugated with fungi extracted from neem leaves.

Figure 4:
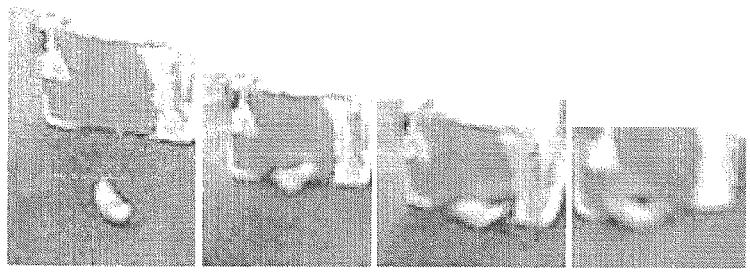
FIG. 4 is a sequence of images displaying the responsiveness of larva fed with magnetic material.

The red palm weevil control system 10 may also include a magnetic field generator 30 for generating a magnetic field to retain red palm weevils that have already ingested food 16 containing magnetic nanoparticles 24, as shown in FIG. 4. The magnetic field generator 30 may be any device capable of generating a magnetic field, and in at least one embodiment, the magnetic field generator 30 may be a magnet. The magnetic field generator 30 may be used in conjunction with food material 16 mixed with one or more magnetic nanoparticles formed from FeO, Fe—Gd, Ag—Cu—B—Fe—Gd or a coating with extract from neem leaves, or any combination thereof. The food material 16 including magnetic nanoparticles 24 may be used to retain red palm weevils using the magnetic field generator 30 after the red palm weevils have ingested the red palm weevil food material 16 having magnetic material therein.

In another embodiment, the light detection system 12 may be positioned on one side of the red palm weevil food material 16, and a mirror 28 may be positioned on an opposite side of the red palm weevil food material 16. In such a configuration, the red palm weevil food material 16 may block reflection of light emitted from the light emitting device 14 to reach the light detection system 12. The mirror 38 may have any appropriate configuration and alignment in relation to the light detection system 12. For instance, the mirror 28 may be placed nonorthonal to the light detection system 12, such as on an include surface, upside down or horizontal. In such an embodiment using a mirror 28, the light detection system 12 and the light emitting device 14 may be in communication with each other, as shown in FIG. 3, may be a single unit or may be housed in a single housing, or any combination thereof.

The red palm weevil control system 10 may be used to detect the presence of one or more red palm weevils, retain red palm weevils that have eaten food material with magnetic nanoparticles 24, and eradicate bacteria within the digestive system of the red palm weevil, which causes the death of the red palm weevil in which the bacteria was present. One or more of these functions may be used simultaneously. The presence of the reed palm weevils may be determined once the red palm weevil eats the food material and thereby creates a pathway for light emitted from the light emitting device 14 to reach the light detection system 12. Light reaching the light detection system 12 is an indication that red palm weevils are present because some of the food has been removed to enable the light to travel from the light emitting device 14 to the light detection system 12. The light is no longer blocked by the food material 16.

Experimentation

In red palm weevils, lignocellulosic digestion is controlled by certain bacteria residing in their guts. The microorganisms in the intestines of the red palm weevils play key physiological functions, which include: cellulose and hemicellulose digestion, acetogenesis, hydrogenesis, methanogenesis, sulfate reduction, and nitrogen fixation in addition to its possibility of employing them as biological control. Significant counts of different aerobic, facultative anaerobic, microaerophilic and strictly anaerobic microbes were isolated from intestinal Larvae gut. They include *Salmonella* sps., *enterococcus* sps. and *Bacillus* sps., etc. These qualitative differences of bacteria, suggest the presence of a complex ecosystem in the gut of red palm weevils.

Isolates from the third instar larva of *Rhynchophorus ferrugineus* by protocol prescribed by the National Committee for Clinical Laboratory Standards were evaluated against the antimicrobial described in this invention and the minimum inhibitory response is shown below.

| Bacteria | MIC (mg/ml) Ag—Cu—B | MIC (mg/ml) Neem extract |
|---|---|---|
| *Salmonella* Sps | 0.06 | 8 |
| *Bacillus cereu.* | 0.05 | 11 |
| *Enerococcus* Sps | 0.06 | 9 |
| *Vibrio Harvyi* | 0.06 | 6 |

A test was conducted to evaluate the antimicrobial activity of Ag—Cu—B in red weevels, both larave and adult. Two groups wach were evaluated. In one group, the red palm weevil was feed was modified to include Ag—Cu—B, while the other group, the control group, was feed unmodified feed. The results show that the larvae was eliminated by day five and that 60% of the adult red palm weevil was eliminated by day five. Hence, the antimicrobial activity of the particles is effective for control of the red palm weevil.

A device was made to evaluate the retardation of red palm weevil due to magnetic attraction where a light emitting device 14 and light detecting device 12, infrared detector, were used to detect the accumulation of larvae population. In another embodiment, the Ag—Cu—B and FeO nanoparticles 24 may be used independently. FeO may be coated with preferred food of the red palm weevil. Upon feeding the material to red palm weevils, a magnetic field generator 30, such as, but not limited to, a magnet, may be used to retain the red palm weevils. Ag—Cu—B may also coated with a food material 16, such as a preferred feed of red palm weevil. Feeding the Ag—Cu—B laced material to the red palm weevils has eradicated at least a portion of the bacteria in the digestive tract of the red palm weevils and has killed a portion of a sample red palm weevils. A mixture of these two nanoparticles 24 in the feed may be utilized for retardation of weevil motion and eradication of the bacteria in the digestive system of the red palm weevil.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A red palm weevil control system, comprising:
   at least one light detection system;
   at least one light emitting device positioned such that light emitted from the at least one light emitting device can be detected by the at least one light detection system;
   at least one red palm weevil food material blocking light emitted from the at least one light emitting device from being sensed by the at least one light detection system;
   wherein the at least one red palm weevil food material comprises at least one magnetic nanoparticle; and
   a magnetic field generator for generating a magnetic field to retain red palm weevils that have already ingested food containing the at least one magnetic nanoparticle.

2. The red palm weevil control system of claim 1, wherein the at least one light detection system comprises at least one solar cell.

3. The red palm weevil control system of claim 2, further comprising at least one radio frequency device in communication with the solar cell that is configured to emit a radio frequency once the solar cell begins to receive light from the at least one light emitting device.

4. The red palm weevil control system of claim 3, further comprising a radio frequency receiver configured to receive a radio frequency emitted by the at least one radio frequency device and to create an alert upon receiving the radio frequency signifying the presence of a red palm weevil.

5. The red palm weevil control system of claim 1, wherein the at least one nanoparticle is conjugated with fungi extracted from neem leaves.

6. The red palm weevil control system of claim 1, wherein the at least one nanoparticle is formed from iron oxide and mixture of silver-copper-boron.

7. The red palm weevil control system of claim 1, wherein the at least one nanoparticle is formed from mixture of Ag—Cu—B—Fe—Gd.

8. The red palm weevil control system of claim 1, wherein the at least one nanoparticle is formed from mixture of Ag—Cu—B.

9. The red palm weevil control system of claim 1, wherein the at least one light detection system and the at least one light emitting device are positioned on one side of the at least one red palm weevil food material, and a mirror is positioned on an opposite side of the at least one red palm weevil food material, whereby the at least one red palm weevil food material blocks reflection of light emitted from the at least one light emitting device to reach the at least one light detection system.

10. The red palm weevil control system of claim 1, wherein the at least one magnetic nanoparticle is formed from FeO.

11. The red palm weevil control system of claim 1, wherein the at least one magnetic nanoparticle is formed from mixture of Fe—Gd.

12. The red palm weevil control system of claim 1, wherein the at least magnetic one nanoparticle is coated with extract from neem leaves.

* * * * *